(12) United States Patent
Aslam et al.

(10) Patent No.: US 11,971,300 B1
(45) Date of Patent: Apr. 30, 2024

(54) CARBON NANO-TUBE POLYMER COMPOSITE MIRRORS FOR CUBESAT TELESCOPE

(71) Applicant: United States of America as represented by the Administrator of NASA, Washington, DC (US)

(72) Inventors: Shahid Aslam, Washington, DC (US); Tilak Hewagama, College Park, MD (US); Nicolas Gorius, Washington, DC (US); Peter C. Chen, Washington, DC (US); Theodor Kostiuk, Greenbelt, MD (US); John R. Kolasinski, Greenbelt, MD (US)

(73) Assignee: United States of America as represented by the Administrator of NASA, Washington, DC (US)

(*) Notice: Subject to any disclaimer, the term of this patent is extended or adjusted under 35 U.S.C. 154(b) by 873 days.

(21) Appl. No.: 17/038,864

(22) Filed: Sep. 30, 2020

Related U.S. Application Data

(60) Provisional application No. 63/023,391, filed on May 12, 2020.

(51) Int. Cl.
| | |
|---|---|
| *G01J 3/02* | (2006.01) |
| *B64G 1/10* | (2006.01) |
| *B64G 1/66* | (2006.01) |
| *G02B 17/06* | (2006.01) |
| *G02B 23/02* | (2006.01) |

(52) U.S. Cl.
CPC .......... *G01J 3/021* (2013.01); *B64G 1/10* (2013.01); *B64G 1/66* (2013.01); *G02B 17/0615* (2013.01); *G02B 23/02* (2013.01)

(58) Field of Classification Search
CPC .. G01J 5/021; B64G 1/10; B64G 1/66; G02B 17/0615; G02B 17/08; G02B 17/00; G02B 17/0804; G02B 17/0812; G02B 17/0816; G02B 17/0892
USPC .......................................................... 359/399
See application file for complete search history.

(56) References Cited

U.S. PATENT DOCUMENTS

| | | | |
|---|---|---|---|
| 8,541,744 B1 * | 9/2013 | Liu | G01S 7/4802 250/338.5 |
| 9,709,713 B1 * | 7/2017 | Chen | G02B 5/0841 |
| 11,543,645 B1 * | 1/2023 | Miller | G02B 27/30 |

(Continued)

OTHER PUBLICATIONS

G Raskin, T Delabie, W De Munter, H Sana, B Vandenbussche, B Vandore, V Antoci, H Kjeldsen, C Karoff, A de Koter, J-M Desert, T Mladenov, D Vandepitte, "CUBESPEC: Low-cost space-based astronomical spectroscopy", Pro. of SPIE, vol. 10698, 106985R-1 to 106985R-12 (Year: 2018).*

(Continued)

*Primary Examiner* — Marin Pichler
*Assistant Examiner* — Leonidas Boutsikaris
(74) *Attorney, Agent, or Firm* — Heather Goo; Matthew F. Johnston; Trenton J. Roche

(57) ABSTRACT

The present invention relates to a compact, lightweight, cost-efficient ultraviolet-visible-far infrared (UV-VIS-IR) telescope system, covering the 300 nm to 2500 nm (0.3 μm to 2.5 μm) spectral range, based on a fast focal-ratio, reflective optics design, and an optical coupling interface appropriate for COTS spectrometers, commensurate with about 1U-2U CubeSat payload volume.

12 Claims, 3 Drawing Sheets

(56) References Cited

U.S. PATENT DOCUMENTS

| | | | |
|---|---|---|---|
| 2006/0231771 A1* | 10/2006 | Lee | G01S 17/95 |
| | | | 250/458.1 |
| 2010/0117893 A1* | 5/2010 | Dreher | B64G 1/66 |
| | | | 342/368 |
| 2015/0162656 A1* | 6/2015 | Fitz-Coy | B64G 1/66 |
| | | | 343/705 |
| 2021/0036429 A1* | 2/2021 | Rommel | D04B 1/14 |

OTHER PUBLICATIONS

"Optics", Hecht-Zajac, Ed. 1979, p. 55 (Year: 1979).*

* cited by examiner

CARBON NANO-TUBE POLYMER COMPOSITE MIRRORS FOR CUBESAT TELESCOPE

ORIGIN OF THE INVENTION

The invention described herein was at least in-part made by an employee of the United States Government and may be manufactured or used by or for the Government of the United States of America for governmental purposes without the payment of any royalties thereon or therefor.

BACKGROUND OF THE INVENTION

1. Field of the Invention

The present invention relates o a compact, lightweight, cost-efficient ultraviolet-visible-infrared (UV-VIS-IR) 1U-2U CubeSat telescope, based on a fast focal-ratio, reflective optics design, and an optical coupling interface appropriate for commercial-off-the-shelf (COTS) spectrometers, and covering the 0.3 µm to 2.5 µm (300-2500 nm) spectral range, which uses carbon nano-tube (CNT) polymer matrix composite primary and secondary mirrors molded from mandrels, and which is capable of mass manufacture.

2. Description of the Related Art

Optical telescopes are an important subsystem in remote sensing applications and communication systems, and such telescope use has increased in many areas of spacecraft applications. Optical communication systems are being developed to deliver high bandwidth data telemetry and require mass-scale, rapid production of compact telescopes.

Space operations leverage nano-satellite spacecraft (NanoSat) that are volume and mass constrained. A popular category within NanoSats are CubeSat spacecraft (CubeSat) which have volumetric standardization. CubeSats are being considered for deep space planetary science investigations which require on-board propulsion, communications, attitude control, power, and propulsion subsystems. The size, mass, quality, spectral range, and aperture, of a CubeSat-compatible telescope, are important parameters in CubeSat science packages.

COTS spectrometers that comply with these constraints are optimized for use with fiber systems and are cost efficient. The ability to leverage COTS instruments present a game changer for CubeSat design. By using these COTS devices, two development pathways can be explored: re-engineering the COTS devices for coupling telescope light using bulk free-space optics, or transforming the telescope beam to a shape appropriate for fiber injection into the devices. The latter method has the advantage of rapid instrument integration provided fiber bend limits and degradation in time are within tolerances. However, mission infrastructure limits the science payload to a particular Unit (U) (i.e., 10 cm×10 cm×10 cm) scale.

Thus, one aim of the present invention would be to have a 2U-3U science package based on a 1U-2U form telescope, by designing a low-mass, fast focal-ratio, reflective telescope, and to investigate techniques for coupling its output to miniature spectrometers. Such a small science package within 2U-3U will allow electronics, avionics, and propulsion in a 6U-12U spacecraft configuration.

Thus, the ultimate goal of the present invention is to provide a "standard" telescope/interface package easily adaptable to a variety of miniaturized instruments in a CubeSat configuration (including use of COTS spectrometers)capable of measurements over a 0.3 to 2.5 µm spectral wavelength range. Such a telescope/interface package would include mirrors which are reproducible, cheap, stiff but lightweight, that can be mass manufactured in the UV-VIS-IR spectral range, and which are compatible with CubeSat based applications.

Such a goal of a developed telescope/interface package and wide wavelength coverage, would enable compact, low mass, and low-cost instrumentation, which could be reproduced for array or swarm CubeSat configurations for lunar, planetary, and Earth science investigations; e.g., reconnaissance and characterization missions to small bodies (asteroids including Trojans, planetary moons and comets), and to study surfaces of the Moon and Mars, atmospheric and auroral emission of Venus, Mars and outer planets, and cometary coma.

Such a telescope/interface package device would also have a role in spacecraft communication systems which are based on low power lasers now commercially available at a fraction of startup costs and commensurate with CubeSat mission budgets. High data bandwidth offered by these systems would enable missions otherwise considered impractical because of data telemetry constraints. In this case, the telescope, an important component in the communications subsystem, would serve as the transmitter of spacecraft command and data handling communications to ground stations (or other proximity spacecraft) and receiving return data.

SUMMARY OF THE INVENTION

The present invention relates to a compact, lightweight, cost-efficient UV-VIS-IR 1U-2U CubeSat telescope, based on a fast focal-ratio, reflective optics design, and an optical coupling interface appropriate for commercial-off-the-shelf (COTS) spectrometers, and covering the 0.3 µm to 2.5 µm (300-2500 nm) spectral range, which uses carbon nano-tube (CNT) polymer matrix composite primary and secondary mirrors molded from mandrels, and which is capable of mass manufacture. Although that reflective properties of the herein described metallic coated optical telescope extends beyond 100 µm, the primary focus of the present invention pertains to the 0.3 µm to 2.5 µm spectral region because of the use of particular optical fibers with flight heritage and relevance to standard communication wavelengths.

In one embodiment, the present invention includes a free space and fiber optic coupling, appropriate for UV-VIS-IR COTS spectrometers, all fitting within a 1U-2U CubeSat volume for the telescope. The telescope and its assembly use carbon nano-tube (CNT) composite material and a mandrel capable of reproduction of multiple identical low-mass telescope optics, enabling low cost systems for array and constellation configurations for lunar and planetary science studies.

The use of a carbon nano-tube (CNT) polymer matrix composite as a mirror material is ideal for telescope mirror fabrication, since forms are easily reproducible, once cast, and do not require polishing and can support a reflective metallic coating.

In one embodiment, a CubeSat spacecraft assembly includes: an off-axis telescope system disposed within a predetermined CubeSat payload volume, the telescope system which is operational in an ultraviolet-visual-infrared (UV-VIS-IR) spectral range spanning from 300 nm to at least 2500 nm (0.3-2.5 µm), the telescope system including a parabolic primary mirror and a hyperbolic secondary mirror; therein the parabolic primary mirror and the hyperbolic secondary mirror are made of a carbon nano-tube polymer matrix composite; an aperture disposed in the parabolic primary mirror; wherein a plurality of light rays entering the telescope system are incident on the parabolic primary mirror and converged on the hyperbolic secondary mirror, and collected by the aperture of the parabolic primary mirror; and an electronics subsystem disposed within the predetermined CubeSat payload volume, the electronics subsystem which processes an output from the aperture.

In one embodiment, the CubeSat spacecraft assembly further includes: a spectrometer disposed within the predetermined CubeSat payload volume, the spectrometer which collects the plurality of light rays from the aperture, the spectrometer which analyzes a spectroscopic content of the plurality of light rays and produces a digitized output spectrum; wherein the output processed by the electronics subsystem is the digitized output spectrum from the spectrometer.

In one embodiment, the CubeSat spacecraft assembly further includes: an optical fiber disposed within the predetermined CubeSat payload volume, the optical fiber which couples the plurality of light rays at a focal plane of the telescope system, the focal plane which is situated behind the parabolic primary mirror.

In one embodiment, the CubeSat spacecraft assembly further includes: a diplexer coupled to the optical fiber, the diplexer which collects the plurality of rays from the focal plane, wherein the plurality of rays are segregated by wavelength into received signals and transmitted signals.

In one embodiment, the CubeSat spacecraft assembly further includes: a laser signal detector which analyzes the received signals, digitizes data of the received signals, and delivers the data to the electronics subsystem for processing.

It one embodiment, the CubeSat spacecraft assembly further includes: a laser source controlled by the electronics subsystem, the laser source which delivers transmitted signals to the diplexer, and from the diplexer to the optical fiber as transmitted light.

In one embodiment, the transmitted light from the optical fiber illuminates the hyperbolic secondary mirror, is incident on the parabolic primary mirror, and emerges from the parabolic primary mirror as a collimated beam.

In one embodiment, the diplexer, the laser source and the laser signal detector are disposed outside the predetermined CubeSat payload volume.

In one embodiment, the parabolic primary mirror and the hyperbolic secondary mirror each have a reflective metallic coating.

In one embodiment, the coating is one of aluminum or silver.

In one embodiment, the CubeSat spacecraft assembly is used in a remote sensing application.

In one embodiment, the CubeSat spacecraft assembly is used in a laser communications application In one embodiment, the telescope system is disposed within a 1U volume and the predetermined CubeSat payload volume is no more than 3U.

Thus, has been outlined, some features consistent with the present invention in order that the detailed description thereof that follows may be better understood, and in order that the present contribution to the art may be better appreciated. There are, of course, additional features consistent with the present invention that will be described below, and which will form the subject matter of the claims appended hereto.

In this respect, before explaining at least one embodiment consistent with the present invention in detail, it is to be understood that the invention is not limited in its application to the details of construction and to the arrangements of the components set forth in the following description or illustrated in the drawings. Methods and apparatuses consistent with the present invention are capable of other embodiments and of being practiced and carried out in various ways. Also, it is to be understood that the phraseology and terminology employed herein, as well as the abstract included below, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the methods and apparatuses consistent with the present invention.

MIKE DESCRIPTION OF THE DRAWINGS

The description of the drawings includes exemplary embodiments of the disclosure and are not to be considered as limiting in scope.

DESCRIPTION OF THE INVENTION

The present invention relates to a compact, lightweight, cost-efficient ultraviolet-visible-infrared (UV-VIS-IR) 1U-2U CubeSat telescope, based on a fast focal-ratio, reflective optics design, and an optical coupling interface appropriate for commercial-off-the-shelf (COTS) spectrometers, and covering the 0.3 µm to 2.5 µm (300-250 nm) spectral range, which uses carbon nano-tube (CNT) polymer matrix composite primary and secondary mirrors molded from mandrels, and which is capable of mass manufacture. Although that reflective properties of the herein described metallic coated optical telescope extends beyond 100 µm, the primary focus of the present invention pertains to the 0.3 µm to 2.5 µm spectral region because of the use of particular optical fibers with flight heritage and relevance to standard communication wavelengths.

In one embodiment, the present invention is based on a fast focal-ratio, reflective optics design, and uses a "standard" telescope free space/fiber optic interface package easily adaptable to a variety of mini-instruments in a CubeSat configuration (including COTS spectrometers), with the payload fitting within a 2U-3U CubeSat volume. In one embodiment, the present invention covers the 0.3 µm to 2.5 µm spectral range.

Since rigorous volumetric constraints of small CubeSat spacecraft impose stringent limits on the aperture, focal length, and mass of telescopes, the present invention includes a method of producing telescopes using CNT mirror substrates and replication in a volume commensurate with common CubeSat spacecraft. The novel use by the inventors of a CNT polymer matrix composite as a minor material shows it is ideal for telescope mirror fabrication, since forms are easily reproducible, once cast, and do not require polishing and can support effective metallic coating, and the method for said telescope fabrication and minor replication is also novel.

In one embodiment, the CNT mirrors of the present invention are molded from mandrels capable of reproduction of multiple identical low-mass telescope optics, enabling low cost, small form-factor science instruments and broader scale developments for unmanned aerial vehicles (UAVs), array and constellation (swarm) CubeSat configurations for lunar, planetary and earth science spectroscopy and radiometry studies, e.g., reconnaissance and characterization missions to small bodies (asteroids including Trojans, moons and comets), and to study surfaces of the Moon and Mars, atmospheric and auroral emission of Venus, Mars and outer planets, and cometary coma.

In one embodiment, the CNT telescope is useful in remote sensing and communication services in imaging, spectroscopy, LIDR, and optical laser-based host-to-home optical communication, for ground and space-based applications. Industrial applications also include vegetation and wildfire identification.

Figure 1A:
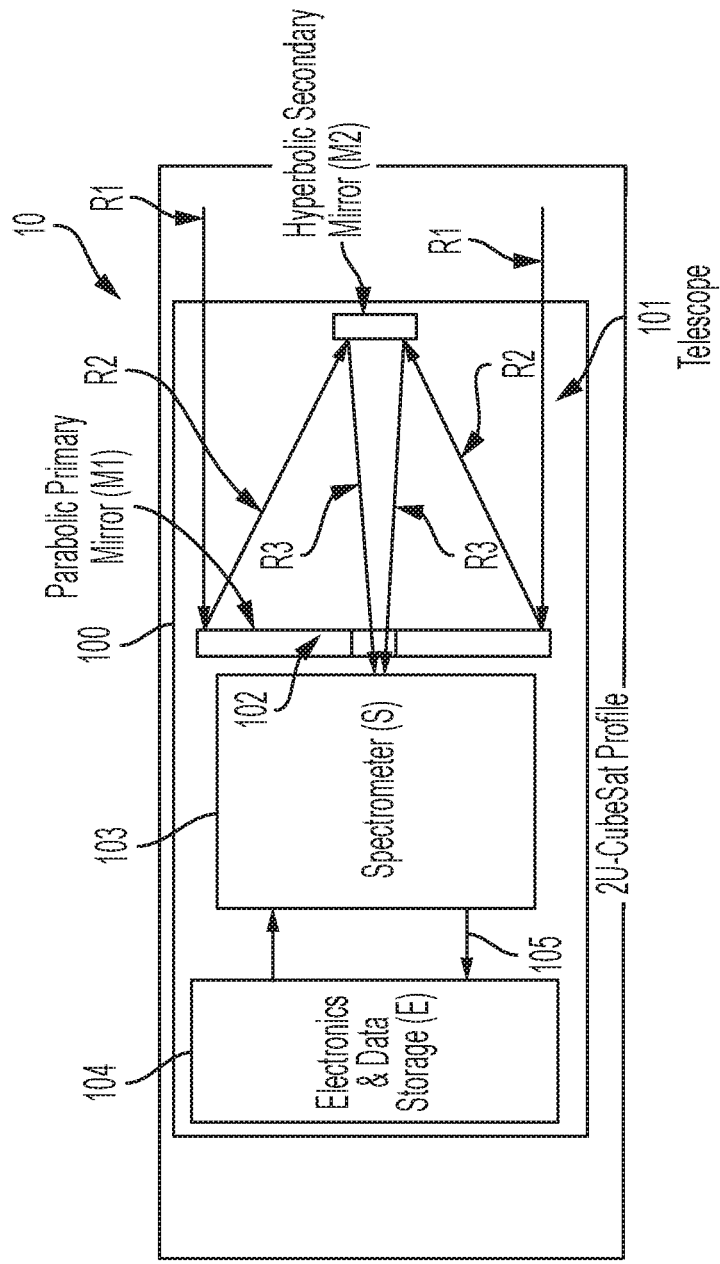
FIG. 1A shows a schematic diagram of a top view of the major subsystems of an ultraviolet-visible-infrared (UV-VIS-IR) 2U-3U CubeSat telescope and payload system directed to remote sensing, according to one embodiment consistent with the present invention.
Figure 1B:
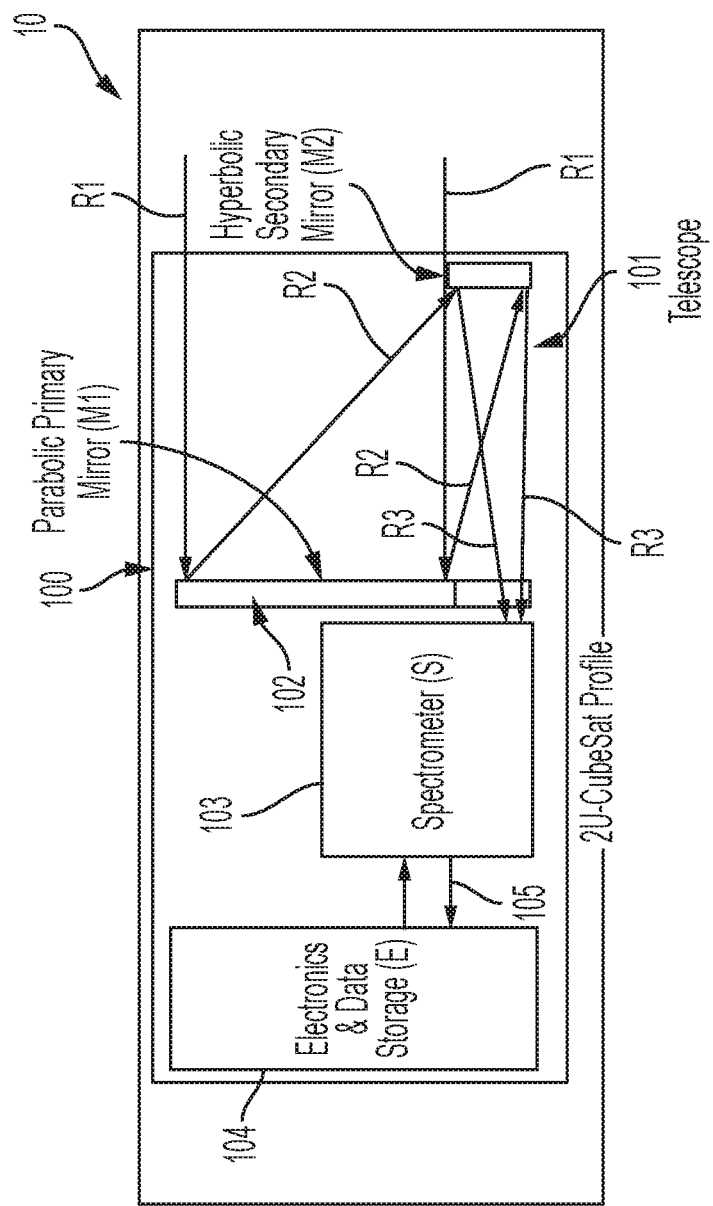
FIG. 1B shows a schematic diagram of a side view of the major subsystems of the CubeSat telescope system of FIG. 1A, according to one embodiment consistent with the present invention.
Figure 2:
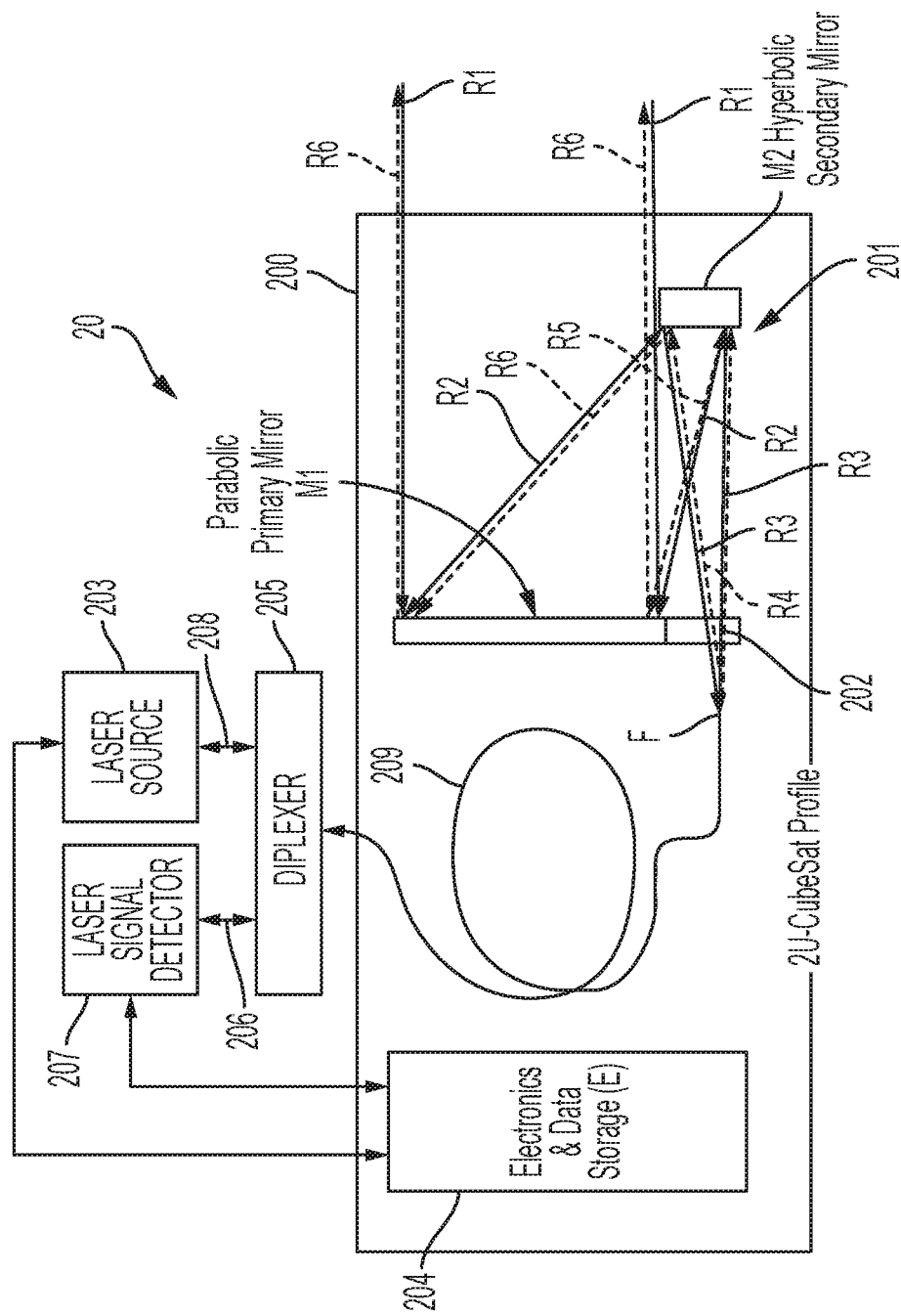
FIG. 2 shows a schematic diagram of a side view of the major subsystems of a UV-VIS-IR 1U-2U CubeSat telescope and coupling system applicable to laser communications systems, according to one embodiment consistent with the present invention.

Turning to one exemplary embodiment of the invention, FIGS. 1A-1B show the major subsystems involved in remote sensing, and FIG. 2 shows the major subsystems involved in laser communications systems 20.

More specifically, FIG. 1A shows a component diagram top view of a CubeSat assembly 10 which shows axial symmetry in the horizontal plane. Generally speaking, the base unit of the CubeSat unit 100 (see FIG. 1A) is 1U with a 1-liter volume cube: 100 mm×100 mm×100 mm linear dimensions. CubeSat configurations are typically integer multiples of this 1U unit with the most common standards being 3U (3 units in a linear 3×1 arrangement). The inventors have estimated that for 6U and 12U spacecraft form factors, the limiting telescope 101 aperture 102 is approximately 85 mm. Thus, the telescope volume associated with the aperture 102 is 1U. Supported by a commercial point spectrometer 103 and electronics 104, the novel remote sensing instrument 10 fits within a 2U total volume. Accounting for small form factor spectrometers and electronics, the estimated volume purely for an optical telescope 101 is a maximum of 1U.

A side view of the embodiment of the CubeSat assembly 10 of FIG. 1A is shown in FIG. 1B, and shows an off-axis configuration in the vertical plane, where the modified reflective Cassegrain telescope 101 design (see FIG. 113) for a point spectrometer 103 includes a parabolic primary mirror M1 and a hyperbolic secondary mirror M2 that fit neatly into a 1U CubeSat volume, for example, where the integrated UV-VIS-IR spectrometer 103 takes up an extra 1U-2U CubeSat volume.

In one embodiment, the mirrors M1, M2 are fabricated of a low-cost, lightweight material, which is an ideal candidate for telescope 101 mirrors M1, M2, since arbitrary forms are easily reproducible using a mandrel. In one embodiment, the material is a CNT polymer matrix composite, but any other suitable material having similar advantages, would be acceptable. In addition, cast mirrors do not require polishing and can support a reflective metallic coating. In one embodiment, the coating of the CNT composite mirror can be silver or aluminum, or any other suitable coating.

In one embodiment, in a remote sensing system 10 applications using a. payload profile 100 as shown in FIGS. 1A-1B (top view and side view, respectively), bounding light rays R1, R2 from a remote source (not shown) are collected by the parabolic primary aperture 102. The concave powered mirror MI directs the converging rays R2 to the hyperbolic secondary mirror M2. The convex configuration of the secondary mirror M2 slows the convergence in the reflected rays R3, forming a focus behind the primary mirror M1. In one embodiment, the rays R3 are collected by the cost-efficient, commercial spectrometer 103, which analyzes the spectroscopic content. The digitized output 105 spectrum of the spectrometer 103 is collected by the electronics subsystem and data storage (E) unit 104, minimally processed by the processor on a single board computer thereof for integrity verification, adding housekeeping data, and saved by the processor to the data storage. The optical design resulted in a compact, 85 mm aperture, f/0.75 telescope, for example.

Depending on the scientific or engineering application, the present invention has an optional operational spectral range spanning ultraviolet-visual-far infrared (UV-VIS-FIR). Transmissive optics have limited range in spectral response; in comparison, telescopes 101 constructed from mirrors M1, M2 with appropriate reflective metallic coatings are compatible with the extended UV-VIS-FIR range spanning 300 nm to well beyond 100 µm.

In one embodiment, a laser communications system 20 (see FIG. 2) application involves laser signals produced by a laser source 203, and generated to communicate information data packets from the host command and data handling (C&DH) unit (not shown) of a CubeSat satellite, from a laser head being collimated and transmitted to a distant receiver (home station telescope on Earth or a proximity spacecraft for inter-spacecraft communication).

In this embodiment, as shown in the component diagram of FIG. 2, as a side view of the system (top view not shown), the light paths R1 in this implementation are identical to that of the remote sensing applications shown in FIGS. 1A-1B. Namely, bounding light rays R1, R2 of the received signal R1 from a remote source (i.e., Earth station or proximity spacecraft for inter-spacecraft communication—not shown) collected by the M1 parabolic primary aperture 102. The concave powered mirror M1 directs the converging rays R2 to the hyperbolic secondary mirror M2. The convex configuration of the secondary minor M2 slows the convergence in the reflected rays R3, forming a focus F behind the primary mirror M1.

In this embodiment, the R3 light rays, focused at the focal plane, couple to an optical fiber 209 which conveys the light to (commercial) diplexer (D) 205 (which may be located outside the 2U volume 200). The diplexer 205 segregates incoming signals by wavelength for received signal (Rx) wavelength and transmitted signal (Tx) wavelength. The received light in the segregated Rx signals 206 are delivered by the diplexer (D) to the Rx (commercial) laser detector 207 (located outside the 2U volume 200) which is a narrow-band passive device. The Rx signal is analyzed by the laser detector 207. As with the previous embodiments in FIGS. 1A-1B, the laser signal detector 207 analyzes and digitizes the data, delivers data to the electronics subsystem (E) 204, minimally processed by the processor contained in the single-board-computer for integrity verification, housekeeping data added, and data and instructions in the received signal are transferred to the spacecraft C&DH (not shown).

In this embodiment, the electronics subsystem 204 also controls a laser source 203. Data from the spacecraft C&DH are reformatted by the electronics subsystem and conveys instructions for the laser source 203 to generate sequences of transmission (Tx) wavelength pulses 208 which are delivered to the diplexer 205 and are directed out of the diplexer 205 to the aforementioned optical fiber 209. The optical fiber 209 transports the Tx light R4 into the 2U volume 200, illuminates mirror M2 (see R5), is incident on mirror M1, to emerge from mirror M1 as a collimated beam R6 which is pointed to, and low-loss transported to, the ground station (or proximity spacecraft for inter-spacecraft communication).

Thus, in the embodiments of FIGS. 1A-B and 2 discussed above, the present invention leverages a unique off-axis optical telescope 101, 201, fabricated from telescope mirrors M1, M2 with shape specifications. Fabrication is based on CNT replication of mass reproduceable, light-weight mirrors M1, M2 using the molds (mandrels), fabrications of mounting adapters, and assembly of mirrors M1, M2 into a CubeSat-compatible telescope 101, 201.

In one embodiment, the mirrors M1, M2, are manufactured in accordance with the methods detailed in U.S. Pat. No. 9,709,713, the contents of which are herein incorporated by reference.

In one embodiment, CubeSat mirrors M1, M2 with parabolic and hyperbolic surface shapes, respectively, were designed and printed using three-dimensional (3D) additive manufacturing technology. Since the surface figures of these printed shells were found to be of insufficient optical quality to be integrated in a telescope assembly, in one embodiment, the present invention improved the figure of the active surface area of these shells to optical quality by pouring the CNT polymer composite over high surface quality mandrels and pressing the 3D printed shells against the mold to fabricate M1, M2 mirrors with precision optical surfaces.

In one embodiment, the mold compound was applied and cured under heat. In one embodiment, after curing the compound and removal from the mandrel, a mold is obtained which has a void that corresponds to the predetermined shape, thickness, and placement offset of the desired product.

In one embodiment, two mandrels were manufactured with precision diamond turning on a substrate of steel overcoat with electrodes of nickel. In this embodiment, the mandrel outer surface shape were a paraboloid and hyperboloid commensurate with the M1, M2 mirror optical surface area requirements. In this embodiment, shell masks with inner surface figure being parabolic (M1 mask) and hyperbolic (M2 mask) were fabricated with additive manufacturing to function as registration guides. The masks contained openings matching the dimensions of the M1, M2 mirrors and were designed for precise replication over the relevant portion of the metal mandrel. In this embodiment, these 3D printed registration shell masks were placed on the parabolic and hyperbolic mandrels to use the design area of the mandrel and define the peripheral shape boundary when replicating the mirrors M1, M2. The masks contain an open area in the center such that the shell volume represents a rectangular torpid. The CNT polymer composite is poured over the exposed area of the mandrel demarcated by the openings in the shell masks.

In one embodiment, metal mandrels were found to have different thermal properties than glass mandrels. In one embodiment, mirror substrate chemistry and tooling and handling were optimized for glass mandrels.

In one embodiment, the CNT mirrors M1, M2 were coated with a reflective metallic coating. In one embodiment, the coating is silver, but the coating could be aluminum or any other suitable material.

In one embodiment, the fabricated mirrors had 4 nm root mean square (RMS) surface roughness, both for the primary parabolic surface deviations and the hyperbolic secondary mirror.

In one embodiment, the telescope assembly 101, 201 was placed in a carbon fiber reinforced polymer-based CubeSat skeleton 100, 200.

Accordingly, the telescope 101, 201 with spectrometer 103 or diplexer 205 assembly functioned as designed for the remote sensing or laser applications, respectively. In one embodiment, the present invention showed that further miniaturizing the pre-spacecraft-deployment telescope profile using a deployable secondary is possible.

The present invention is useful for planetary science missions and earth science missions. The telescope subsystem and low-cost, mass-produced spectrometers can lead to rapid CubeSat instrument development, paving the way for large scale deployment. A telescope 101, 201 based all reflective optics telescope with select mirror coatings can support the broad UV-VIS-IR operating range required for planetary science missions to Venus, asteroids, and comets, and for Earth observing missions. The 1.0 μm to 2.0 μm enables a Venus mission to exploit a night-time atmospheric window. Spacecraft communications are enabled with this compact, low-cost alternative to individually diamond turned mirrors.

The advantages of the unique mirrors are that they are cheap, stiff and lightweight, UV-VIS-IR range, can be mass manufactured, CubeSat compatible, and can be used in CubeSat swarm applications in both remote sensing and optical communication applications.

It should be emphasized that the above-described embodiments of the invention are merely possible examples of implementations set forth for a clear understanding of the principles of the invention. Variations and modifications may be made to the above-described embodiments of the invention without departing from the spirit and principles of the invention. All such modifications and variations are intended to be included herein within the scope of the invention and protected by the following claims.

What is claimed is:

1. A CubeSat spacecraft assembly, the spacecraft assembly comprising:
an off-axis telescope system disposed within a predetermined CubeSat payload volume, said telescope system which is operational in an ultraviolet-visual-infrared (UV-VIS-IR) spectral range spanning from 300 nm to at least 2500 nm, said telescope system including a parabolic primary mirror and a hyperbolic secondary mirror, wherein said telescope system is disposed within a 1U volume,
wherein said parabolic primary mirror and said hyperbolic secondary mirror are made of a carbon nanotube polymer matrix composite;
an aperture disposed in said parabolic primary mirror, wherein a plurality of light rays entering said telescope system are incident on said parabolic primary mirror and converged on said hyperbolic secondary mirror, and collected by said aperture of said parabolic primary mirror; and
an electronics subsystem disposed within said predetermined CubeSat payload volume, said electronics subsystem which processes an output from said aperture, wherein said predetermined CubeSat payload volume is no more than 3U.

2. The CubeSat spacecraft assembly of claim 1, the spacecraft assembly further comprising:
- a spectrometer disposed within said predetermined CubeSat payload volume, said spectrometer which collects said plurality of light rays from said aperture, said spectrometer which analyzes a spectroscopic content of said plurality of light rays and produces a digitized output spectrum,
- wherein said output processed by said electronics subsystem is said digitized output spectrum from said spectrometer.

3. The CubeSat spacecraft assembly of claim 1, the spacecraft assembly further comprising:
- an optical fiber disposed within said predetermined CubeSat payload volume, said optical fiber which couples said plurality of light rays at a focal plane of said telescope system, said focal plane which is situated behind said parabolic primary mirror.

4. The CubeSat spacecraft assembly of claim 3, the spacecraft assembly further comprising:
- a diplexer coupled to said optical fiber, said diplexer which collects said plurality of rays from said focal plane, wherein said plurality of rays are segregated by wavelength into received signals and transmitted signals.

5. The CubeSat spacecraft assembly of claim 3, the spacecraft assembly further comprising:
- a laser signal detector which analyzes said received signals, digitizes data of said received signals, and delivers said data to said electronics subsystem for processing.

6. The CubeSat spacecraft assembly of claim 5, the spacecraft assembly further comprising:
- a laser source controlled by said electronics subsystem, said laser source which delivers transmitted signals to said diplexer, and from said diplexer to said optical fiber as transmitted light.

7. The CubeSat spacecraft assembly of claim 6, wherein said transmitted light from said optical fiber illuminates said hyperbolic secondary mirror, is incident on said parabolic primary mirror, and emerges from said parabolic primary mirror as a collimated beam.

8. The CubeSat spacecraft assembly of claim 7, wherein said diplexer, said laser source and said laser signal detector are disposed outside said predetermined CubeSat payload volume.

9. The CubeSat spacecraft assembly of claim 1, wherein said parabolic primary mirror and said hyperbolic secondary mirror each have a reflective metallic coating.

10. The CubeSat spacecraft assembly of claim 9, wherein said coating is one of aluminum or silver.

11. The CubeSat spacecraft assembly of claim 2, wherein the CubeSat spacecraft assembly is used in a remote sensing application.

12. The CubeSat spacecraft assembly of claim 7, wherein the CubeSat spacecraft assembly is used in a laser communications application.

* * * * *